March 27, 1928.  C. I. HALL  1,664,210
VIBRATION RECORDER
Filed July 16, 1923
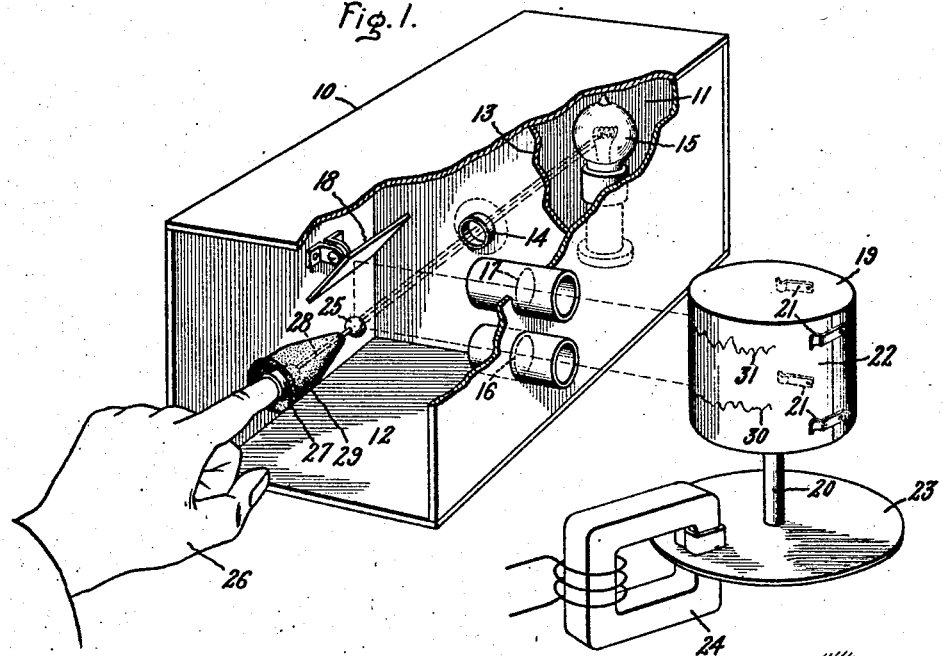
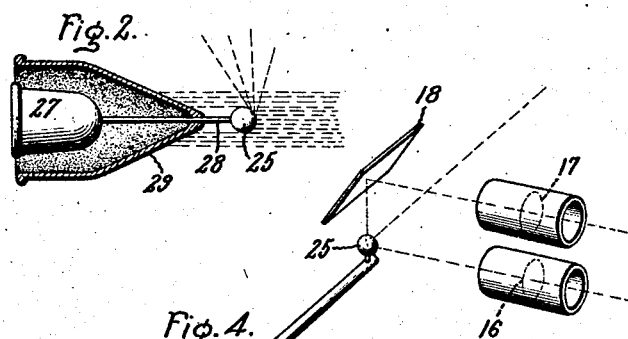
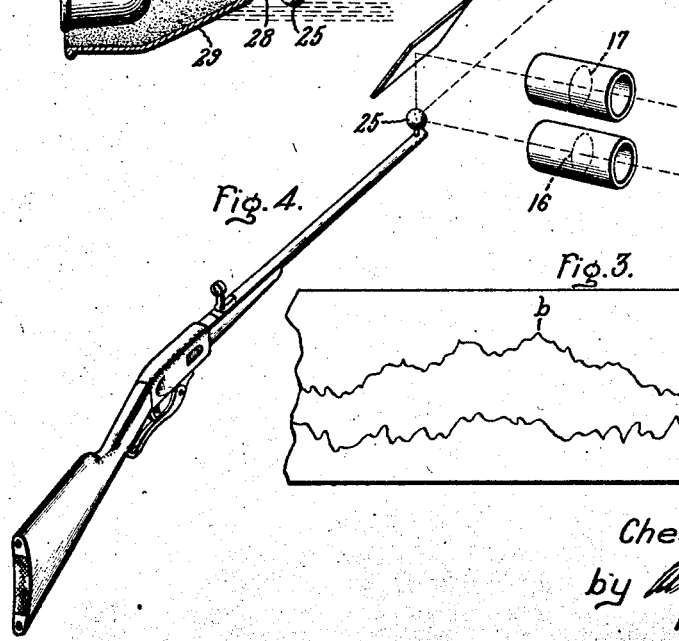
Inventor
Chester I. Hall
by [signature]
His Attorney Patented Mar. 27, 1928.

1,664,210

UNITED STATES PATENT OFFICE.

CHESTER I. HALL, OF FORT WAYNE, INDIANA, ASSIGNOR TO GENERAL ELECTRIC COMPANY, A CORPORATION OF NEW YORK.

VIBRATION RECORDER.

Application filed July 16, 1923. Serial No. 651,737.

My invention relates to recording apparatus of the type wherein a beam of light, the movement of which is made responsive to a function under investigation, is projected upon a screen or a photographic film. This invention particularly relates to a new type of mirror for this type of apparatus.

In the known type of photographic recorders it has been the practice to provide the movable member with a mirror having a plane surface, to project a beam of light onto said surface, and to record the reflected light beam thus produced onto a suitable screen or film. With such a mirror there will be as many directions of reflection for the single light beam as there are planes of position of the mirror. It is therefore necessary in order to obtain any useful results from such a mirror reflector to restrain the movement of the mirror to one axis of rotation, thereby limiting the movement to be studied by a single mirror to one axis of rotation and necessitating a delicate pivoting of the mirror.

In my improved recorder, I make use of a small spherical mirror and preferably attach it directly to the movable object without pivots of any kind. By a spherical mirror I mean the outer surface of a sphere. Parallel light rays are then projected upon the sphere and its movements may be accurately observed by means of a point of light reflected from the outer surface of the sphere from any direction from which an illuminated portion of the sphere can be observed.

The movement of the spherical mirror may, but need not be restrained to move in any particular manner, since the sphere in turning about any axis will always reflect a beam of light in the desired direction and the reflected beam of light will change its position only when there is a bodily movement of the sphere in a direction having a component at right angles to the reflected light beam. By suitable recording apparatus the movement of the sphere in any one or more planes at any desired angle or angles to each other may be reproduced by a single mirror. The applications of my invention are practically unlimited. The spherical mirror, due to its simple, inexpensive mounting and its adaptability to universal movement and its multibeam producing characteristics for a single set-up, makes my improved recorder an ideal instrument for ordinary purposes. The fact that the movement of the mirror may be entirely unrestrained in direction makes it possible to accurately record phenomena not possible with previous types of recorders.

It would be entirely possible in a vibration recorder of this general form to use a very small electric lamp in place of the spherical mirror but obviously the source of illumination will be very large in area and would therefore give a very wide line on the recording film. There is a certain low limit in size to which an electric lamp can be made and the smallest one available is still entirely too large for this purpose. It was therefore necessary to devise some other form of light source. This form of light source in the invention under discussion consists of a system containing primary and secondary members. The primary light source is a true light source projecting a parallel beam of rays in which the secondary light source lies. This secondary light source consists of a spherical mirror which has the peculiar characteristic of presenting from any point of view the extremely small area reflecting light in that particular direction. Theoretically, assuming that an absolutely perfect sphere could be formed and that the light rays falling upon it were exactly parallel, then there could be only one point on the sphere as seen from a given position at infinity reflecting in that particular direction. Of course in practice the sphere is relatively inaccurate, the light beam from the primary source is not composed of exactly parallel rays, and we are operating at a finite distance, so that there is an area of illumination which constitutes the light source so far as the vibration recorder itself is concerned. No matter what the direction of movement of the sphere may be nor how much it is rotated about any axis, this condition still persists; that is, from some particular part of the surface a small area will be in the proper position to reflect the beams from the primary source into the recording apparatus.

The features of my invention which I believe to be novel and patentable will be pointed out in the claims appended hereto. A few applications of my invention will now be explained in connection with the accompanying drawings in which Figure 1 diagrammatically illustrates my invention applied to record tremors of the human body; Fig. 2 represents a detail view of a preferred manner of mounting and attaching the spherical mirror to a patient's hand; Fig. 3 represents the type of record produced by the apparatus of Fig. 1; Fig. 4 illustrates the application of the invention to the study of the movement of a gun in the hands of a marksman and Fig. 5 illustrates the application of the invention to the recording of electrical phenomena.

Referring to Fig. 1, 10 represents a suitable box made of opaque material. The box is divided into two compartments, a closed inner compartment 11, and an outer compartment 12, having its outer end left open. The two compartments are separated by a partition 13 having a central opening. In this opening is secured a lens 14. The closed compartment contains a suitable light source represented as an incandescent lamp 15. The purpose of the lens 14 is to project parallel light rays from the light source 15 to the outer compartment 12. The outer compartment is provided, in this instance, with a pair of focusing lenses 16 and 17, one above the other, in a side wall of the box. The position of these lenses may be adjusted at right angles to the wall if desired and for that purpose they are mounted in tubes which fit closely into openings in the side wall. In line with the upper lens 17 and above the parallel light rays projected from the inner chamber to the outer chamber is mounted a plane mirror 18 set at an angle of 45° with the horizontal position of the box. Mounted outside the box and in alignment with the lenses 17 and 18 is a drum 19. The drum is shown supported on a vertical shaft 20 and is provided with suitable clips 21 for the purpose of securing a strip of photosensitive paper 22 thereon. The drum may be rotated in any convenient manner, preferably at a predetermined constant speed so as to time the film record. For this purpose I have indicated the shaft 20 as being driven by a small induction electric motor comprising a disc 23 of conducting material and a shaded pole field member 24 for driving the disc. The drum 19, may, if desired, be mounted integral with the box 10 and may be enclosed in a light-tight compartment communicating with the lenses 16 and 17, or else the apparatus will be used in a darkened room. Any desired multiplication of the movement to be recorded may be obtained in the usual manner by varying the distance of the drum 19 from the condensing lens. If a permanent record is not required the drum may of course be replaced by an ordinary screen.

The recording apparatus is made complete by the provision of a small spherical mirror 25 adapted to be positioned in the outer compartment of box 10 within the beam of parallel light rays coming from the source 15 and in alignment with the lower lens 16. The mirror being perfectly spherical does not throw its reflected rays out of focus with the condensing lenses when the mirror is moved or twisted about its own axis as would be the case with a plane mirror. I have found that a polished tungsten ball about $\frac{1}{32}''$ in diameter is admirably suited for this mirror. A tungsten mirror has the property of reflecting ultra-violet rays as well as ordinary light rays to a greater extent than any other material which I have tried out, and a tungsten sphere seems to give a sharper and brighter light beam than a spherical mirror of polished steel or of ordinary silver. It is not essential, however, that the sphere be made of tungsten, since other types of spherical mirrors will answer the purpose but will not produce quite so sharp light beams.

With the mirror 25 in the position shown in Fig. 1, it will be evident that a multitude of bright narrow beams of light will be reflected in all directions from the mirror except towards a position back of the sphere out of the reflecting range. This is illustrated in Fig. 2. There will, however, be only a single beam reflected in any given direction, and it will be reflected from the spot on the sphere which coincides with the line drawn from the center of the sphere making equal angles with the angle of incidence and the angle of reflection. This may be visualized by considering the surface of the sphere made up of a multitude of minute plane mirrors placed side by side tangent to its surface and the phenomena may be seen by observing a well polished spherical surface when held in the sunlight. If the sphere be rotated in any direction about its own center the direction of the reflected beam of light will not change. It will, however, be reflected from different portions of the sphere. If the sphere be moved in a plane at right angles to the line of vision the beam of reflected light will move with it. The distance moved by the sphere and the point thereon from which the beam is reflected will not be theoreticallly equal since the point from which the beam is reflected will shift about the sphere slightly. But if the radius of the sphere be made small in comparison to the distance moved the two movements may be considered to be equal for all practical purposes.

The radius of the spherical mirror as shown in the drawing is enlarged with respect to the associated apparatus for the purpose of illustration.

In Fig. 1 the movement of a beam reflected through the lower lens 16 onto the film 22 will be proportional to the movement of the sphere in a vertical plane at right angles to the reflected beam. The beam reflected from the sphere to the mirror 18 and from thence through the upper lens 17 will be proportional to the movement of the sphere in a horizontal plane. In like manner the movement of the sphere in any other plane may be reproduced if desired onto the same film 22 or onto a different film or screen. It will thus be evident that the movement of the spherical mirror may be studied and recorded from any desirable angle or angles.

If it is desired to study the vibration or movements of any body all that is necessary to do is to directly or indirectly convey said movement to the spherical mirror keeping the movements within reasonable limits so as not to move the sphere outside the parallel light rays from source 15 or outside the focus of the condensing lens. Of course the physical dimensions of the parts may be enlarged to any desired extent to accommodate greater movements than have been contemplated by the present illustration. In Fig. 1 the sphere 25 is shown attached to a person's hand 26 by means of a thimble 27 provided with a slender rod 28 as is more clearly shown in Fig. 2. Preferably a covering 29 having a dull, non-reflecting surface is provided for the thimble to prevent reflections from the thimble which might otherwise cloud the record. To record the tremor of a person he puts on the thimble and is merely instructed to hold his finger with the spherical mirror in the light rays opposite the lens 16 as illustrated in Fig. 1. The movements of the sphere will correspond exactly to the natural tremor of the hand since the latter is entirely unrestrained. The lamp 15 being lit, the drum 19 is rotated and the up and down tremors of the hand will be recorded on the lower portion of the film as at 30, while the horizontal tremors of the hand will be recorded on the upper part of the hand as at 31.

In Fig. 3, I have represented an actual reproduction of such a tremor recorded with my improved apparatus. The record here shown is the paralysis agitans of a patient's right hand. Such a record will ordinarily show the effects of heart beats. In Fig. 3, the high points marked $b$, $b$ of the upper curve indicate the heart beat intervals of the patient. Experiments have shown that the effect of fatigue is readily recognized by the character of the recorded tremors. The apparatus described makes it very easy for physicians to study the natural tremors of the human body, and, as it is now generally supposed, to detect certain ailments which produce characteristic tremors.

In Fig. 4 I have represented the application of my invention to a recording apparatus for studying the movements of a gun. If it is desired to study the characteristic of a marksman's aim, he takes the gun and aims at an object holding the spherical mirror 25 which is attached to the gun, preferably near the muzzle, in proper alignment with the recording apparatus. The effect of pulling the trigger on the aim and the actual firing of the gun may also be recorded in this manner. In like manner the spherical mirror may be attached to any other object the movement or vibrations of which it is desired to study.

In Fig. 5 I have represented the spherical mirror 25' resiliently suspended in the field of a plurality of electromagnets 32 whereby various electrical phenomena may be recorded in sequence by this type of mirror, the other parts of the recording apparatus having been omitted. By the same arrangement the simultaneous relative effects of the three magnets may be recorded. For these purposes the sphere will have an inner core of magnetic material or it may be made of a polished steel ball.

In accordance with the provisions of the patent statutes. I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. A recording apparatus comprising a surface for receiving light beams, a light source, reflecting means intermediate said source and surface adapted to be freely movable in any direction for reflecting a light beam from said source to said surface, the movements of said beam corresponding to the movements of said reflecting means in one plane and means for projecting another light beam from said reflecting means to said surface corresponding to the movements of said reflecting means in a different plane.

2. A recording apparatus comprising a spherical mirror adapted to be freely movable, means for projecting parallel light rays onto said mirror and means for projecting a plurality of light beams from said mirror to a light ray receiving surface, the movements of the plurality of beams corresponding respectively to the movements of said mirror in a plurality of different planes.

3. Apparatus for recording the tremors of the human body comprising means for producing a zone of parallel light rays, a spherical mirror, means for conveying unrestrained movements from the human body to said mirror, a light ray receiving surface, means for directly projecting a light beam from said mirror to said surface, and means for projecting a light beam to said surface reflected from said mirror at a different angle to that of the directly projected beam.

4. A vibration recorder comprising means for producing a zone of parallel light rays, a spherical reflecting mirror adapted to be positioned within said zone and to be moved therein in response to the phenomenon to be recorded, a light ray receiving surface, and a lens between said surface and said mirror for directing a light beam reflected from said mirror to said surface.

In witness whereof, I have hereunto set my hand this 11 day of July, 1923.

CHESTER I. HALL.